(12) United States Patent
Hwang et al.

(10) Patent No.: US 6,726,374 B2
(45) Date of Patent: Apr. 27, 2004

(54) GBIC WITH ENHANCED GROUNDING

(75) Inventors: Jenq-Yih Hwang, Irvine, CA (US); Dennis B. Jones, Orange, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 33 days.

(21) Appl. No.: 09/922,992

(22) Filed: Aug. 3, 2001

(65) Prior Publication Data

US 2003/0026516 A1 Feb. 6, 2003

(51) Int. Cl.[7] .................................................. G02B 6/36
(52) U.S. Cl. ............................ 385/88; 385/92; 385/94; 385/14
(58) Field of Search .............................. 385/14, 92, 88, 385/89, 94, 16; 361/752, 753, 799, 788, 800, 803; 439/329

(56) References Cited

U.S. PATENT DOCUMENTS

| | | | |
|---|---|---|---|
| 5,478,246 A | * 12/1995 | Cheng | 439/64 |
| 5,864,468 A | * 1/1999 | Poplawski et al. | 361/753 |
| RE36,820 E | * 8/2000 | McGinley et al. | 361/752 |
| 6,312,296 B1 | * 11/2001 | Jones | 439/751 |
| 6,517,382 B2 | * 2/2003 | Flickinger et al. | 439/607 |
| 6,532,155 B2 | * 3/2003 | Green et al. | 361/733 |

* cited by examiner

*Primary Examiner*—Drew Dunn
*Assistant Examiner*—Joshua L Pritchett
(74) *Attorney, Agent, or Firm*—Wei Te Chung

(57) ABSTRACT

A giga-bit interface converter (GBIC) includes a die cast metal housing forming integral grounding tabs for adding stability and increasing ESD grounding path. The grounding tabs are provided on opposite sides of SCA-2 connector of the GBIC for electrically engaging grounding terminals of a matable female SCA-2 connector. Furthermore, grounding pads are formed on a circuit board of the GBIC for direct engagement with the conductive housing to complete a grounding path to electronics of the circuit board.

5 Claims, 3 Drawing Sheets

GBIC WITH ENHANCED GROUNDING

BACKGROUND OF THE INVENTION

1. Field of the Invention

The present invention relates generally to a giga-bit interface converter (GBIC) with enhanced grounding, and particularly to a GBIC having a metal die-cast housing forming integral grounding tabs on a single connector attachment (SCA)-2 connector end of the housing for adding mechanical stability and forming a grounding path for electro-static discharge (ESD) purposes. In addition, grounding pads have been added to a printed circuit board (PCB) for pushing against the housing to complete the grounding path to electronics. The present invention also relates to a method for manufacturing a GBIC with enhanced grounding.

2. Description of Related Art

A GBIC is a high-speed data transfer switch that can be used to interconnect work stations, main frames, supercomputers and storage devices. It can be employed at various locations in a computer network where data is transferred in a giga bit level. A high-speed data transfer switching is used in many applications such as video on demand and interactive video, which require faster access to large data storage systems such as direct access storage devices (DASDs) and random access image devices (RAIDs).

A GBIC 20 invented by the same inventors as the present invention, which is related to copending application Ser. No. 09/626,524, is shown in FIG. 1 of the attached drawings. The GBIC 20 includes input and output ports 135, 125 with optical subassemblies 375, 325 mounted therein for connection of electronic components within a transceiver housing 110 to electrical or optical communication links. Additionally, the GBIC 20 includes a transceiver interface connector, such as a male SCA-2 connector 250 to mate with a female SCA-2 connector. A PCB 425 is held by the optical subassemblies 375, 325 and the connector 250.

The GBIC 20 forms a plastic post 115 on each side of the SCA-2 connector 250 with a grounding clip 118 fixed thereon. The grounding clips 118, each with one end exposed to electrically engage with a grounding piece of an external electronic device mated with the connector 250, are electrically connected to the PCB 425 within the GBIC housing 110 to form a grounding path. Furthermore, it is well known that the operation of high-speed transceivers can produce undesirable electromagnetic interference (EMI) and radio-frequency or interference (RFI). To minimize EMI/RFI emissions, a conductive layer formed on the housing 110 is needed. The conductive layer is formed by metal plating, wet plating, or vacuum metalization, or alternatively it may be an aluminum or stainless steel sheet to dissipate an electrostatic discharge.

The above described conventional GBIC has several drawbacks. For example, its manufacture process is complicated and it provides a very limited grounding path.

Therefore, there is a need for a GBIC which has a simple structure and a large and effective grounding path.

SUMMARY OF THE INVENTION

In view of the above, it is an object of the present invention to provide a GBIC having a simple structure and a large and effective grounding path.

In accordance with the present invention, a GBIC is provided with a conductive housing made by die casting metallic material. The GBIC comprises input and output ports at a first end of the housing, and an electrical connector, such as a male SCA-2 connector, at a second end of the housing. The housing forms a pair of metal posts on opposite sides of the male SCA-2 connector for engaging grounding terminals of a matable female SCA-2 connector. Furthermore, grounding traces are formed on a circuit board of the GBIC for direct electrical connection with the housing. Therefore, an effective grounding path is established and the manufacturing process is simplified.

DETAILED DESCRIPTION OF PREFERRED EMBODIMENT

Reference will now be made to the drawings to describe the present invention in detail.

Figure 2:
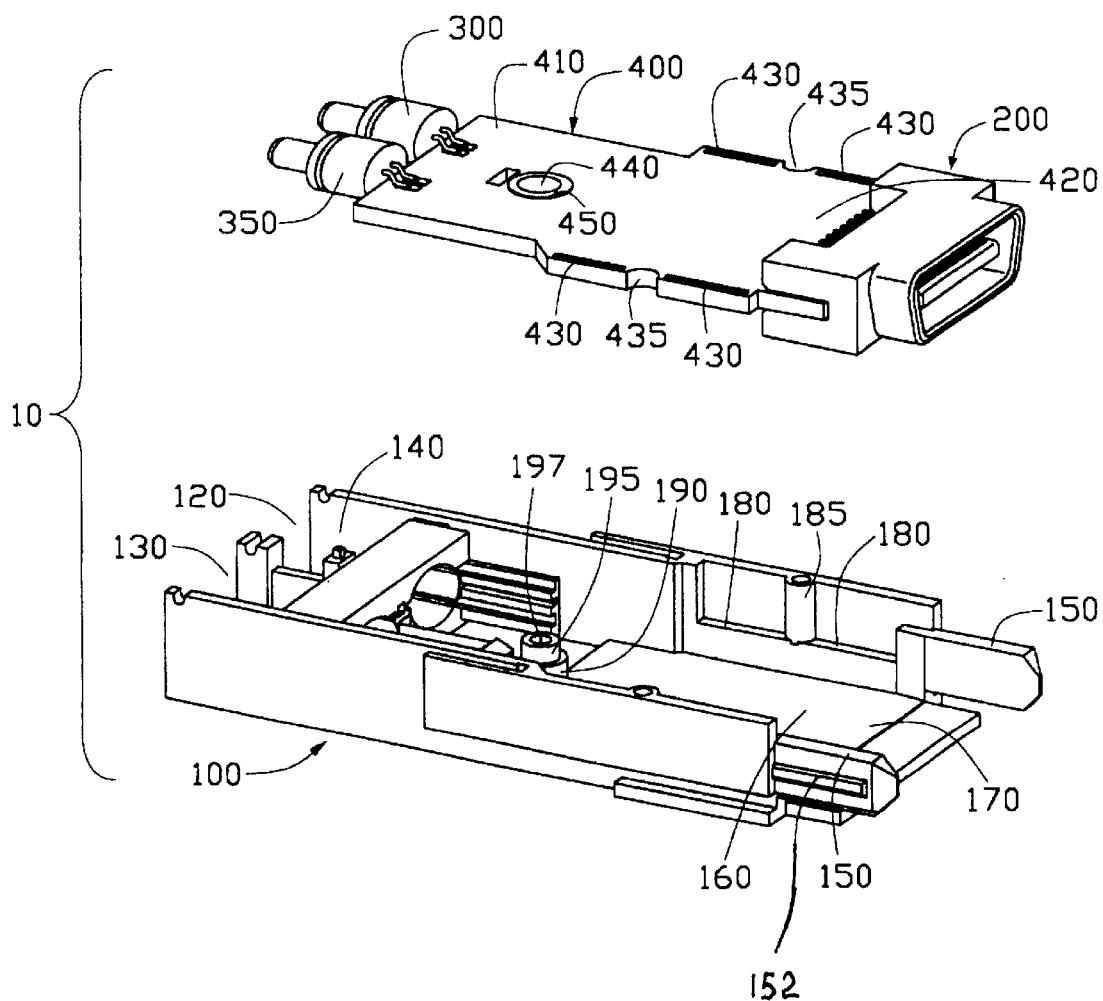
FIG. 2 is an exploded view of a GBIC according to the present invention with a cover removed.
Figure 3:
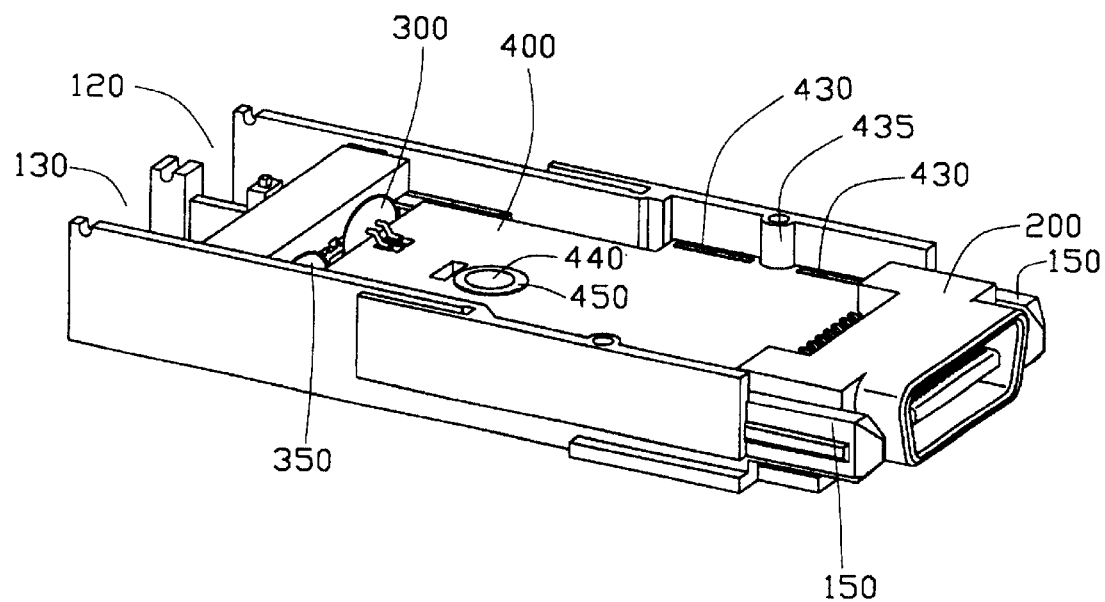
FIG. 3 is an assembled view of FIG. 2.

Referring to the drawings, and particularly to FIGS. 2 and 3, a giga-bit interface converter (GBIC) constructed in accordance with the present invention and generally designated with reference numeral 10 is depicted. The GBIC 10 comprises a die-cast housing 100 made of a conductive material, such as metal, for receiving and housing optical subassemblies 300, 350, a printed circuit board (PCB) 400 and a male single connector attachment (SCA)-2 connector 200. Preferably, a cover (not shown) is removably attached to the housing 100 for covering the parts encased in the housing 100.

The housing 100 of the GBIC 10 forms fiber optic duplex receptacles 120, 130 at a first end 140 and a pair of metal posts 150 at an opposite second end 160, each metal post 150 having a grounding tab 152 for electrically engaging with a grounding piece (not shown) of an external electronic device which is mated with the connector 200. The receptacles 120, 130 are specifically dimensioned to receive a fiber optic duplex plug (not shown). For example, an SC duplex plug may be inserted in the receptacles 120, 130 whereby the receptacle 120 receives a plug for sending data and the receptacle 130 receives a plug for receiving data. The grounding tabs 152 of the metal posts 150 are provided to mate with grounding terminals of a female SCA-2 connector (not shown) to establish a direct chassis grounding path therebetween. In addition, the metal posts 150 also function to mechanically reinforce the engagement between the male SCA-2 connector 200 and the female SCA-2 connector.

The optical subassembly 300 is positioned in the receptacle 120 for sending data over a data link and the optical subassembly 350 is positioned in the receptacle 130 for receiving data from a data link. Preferably, transmission and receipt of optically encoded data are performed by a laser diode (not shown) located within the optical subassembly 300 and a photo diode (not shown) located within the optical subassembly 350. Both the laser diode and the photo diode are electrically connected to the PCB 400 fixed in the housing 100.

The PCB 400 has first and second ends 410, 420. Incorporated onto the PCB 400 is a circuitry (not shown) for transmitting and receiving optically encoded data. The optical subassemblies 300, 350 are mechanically and electrically connected to the first end 410 of the PCB 400. The SCA-2 connector 200 is mounted to the second end 420 of the PCB 400. Therefore, the PCB 400 is fixed between the optical subassemblies 300, 350 and the SCA-2 connector 200.

The PCB 400 comprises two pairs of grounding pads 430 formed on opposite sides thereof. A recess 435 is defined between each pair of the grounding pads 430. In the embodiment illustrated, two projections (not labeled) are formed along each side of the PCB 400, each two projections defining the recess 435 therebetween. The grounding pads 430 are formed on the projections. Furthermore, a screw hole 440 is defined in the PCB 400, with a grounding strip 450 provided therearound.

Two pairs of flat ledges 180 are formed on opposite side walls of the housing 100, for engaging with and supporting the grounding pads 430 of the PCB 400 thereon. Between each pair of the flat ledges 180 is a cylinder 185, for mating in the recess 435 of the PCB 400. On the bottom 170 of the housing 100, a post 190 is provided for mating with the grounding strip 450 of the PCB 400. A standoff column 195 with a hole 197 defined therein is formed on the post 190, the standoff column 195 extending through the through hole 440 to receive a downwardly extending screw (not shown, but reference can be made to the aforementioned copending application Ser. No. 09/626,524).

The PCB 400 together with the optical subassemblies 300, 350 and the SCA-2 connector 200 is mounted within the housing 100. The PCB 400 is supported by the flat ledges 180 and the post 190. The optical subassemblies 300, 350 are received in the receptacles 120, 130. The SCA-2 connector 200 is sandwiched between the metal posts 150. The grounding pads 430 electrically engage with the flat ledges 180 and the grounding strip 450 electrically contacts the post 190, thereby establishing relatively expansive and effective grounding paths between the PCB 400 and the conductive housing 100.

Figure 1:
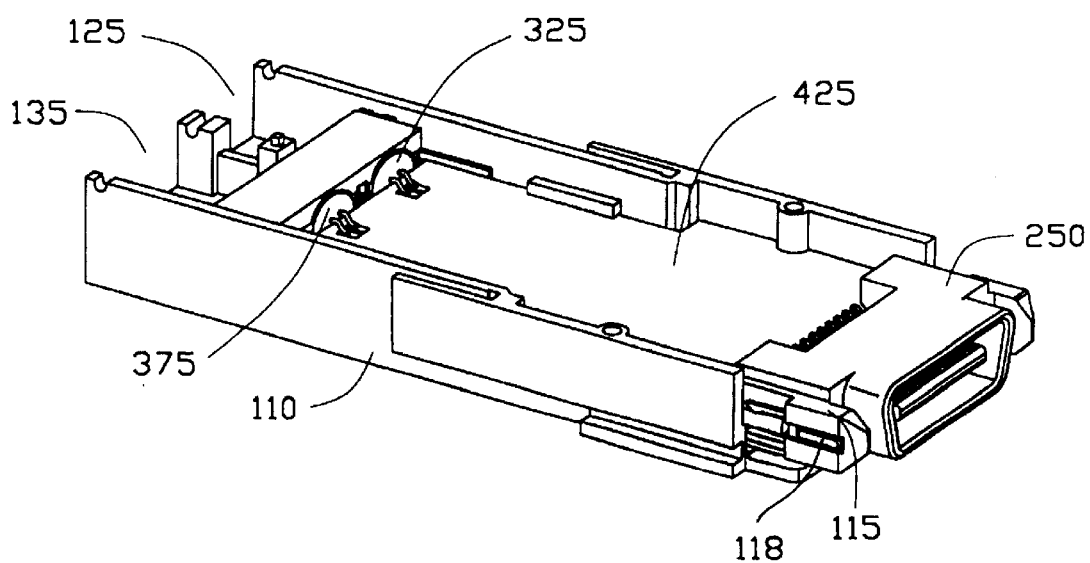
FIG. 1 is a perspective view of an earlier invented GBIC with a cover removed.

It should be noted that unlike the conventional GBIC 20 (see FIG. 1) in which the plastic post 115 and the associated grounding clip (tab) 118 are a part of the connector 250 requiring electrical connection to the grounding circuit of the printed circuit board 425, in the instant invention the metal post 150 and the associated grounding tab 152 are integrally formed with the conductive housing 100, and the grounding pads 430 and the grounding strip 450 are formed on the printed circuit board 420. The grounding pads 430 and the grounding strip 450 electrically engage with the housing 100, to provide more secure and reliable mechanical mating with the complementary connector, and to provide enhanced direct electrical grounding with a chassis.

While a preferred embodiment in accordance with the present invention has been shown and described, equivalent modifications and changes known to persons skilled in the art according to the spirit of the present invention are considered within the scope of the present invention as defined in the appended claims.

What is claimed is:

1. A giga-bit interface converter comprising:

a conductive housing having a first end and a second end;

a printed circuit board having a first end and a second end, the printed circuit board being mounted in the housing;

optical subassemblies mechanically and electrically connected to the first end of the printed circuit board for performing conversion between external optical signals and electrical signals of the printed circuit board; and an electrical connector mounted to the second end of the printed circuit board adapted to engage an external electrical device;

wherein the printed circuit board has at least one grounding pad formed thereon, and the at least one grounding pad engages with the housing to form at least a grounding path therebetween.

2. The giga-bit interface converter as described in claim 1, wherein the housing forms grounding tabs at the second end thereof.

3. The giga-bit interface converter as described in claim 2, wherein the grounding tabs of the housing engagable with grounding terminals of the external electrical device to form direct chassis grounding paths therebetween.

4. A method for manufacturing a giga-bit interface converter, comprising the steps:

providing a conductive housing having a first end and a second end, the housing forming grounding tabs at the second end thereof for electrically grounding with an external device to create direct chassis grounding;

providing a printed circuit board having a first end and a second end, with optical subassemblies mounted to the first end thereof and an electrical connector mounted to the second end thereof; and providing at least one grounding pad on the printed circuit board to directly electrically connect with the housing and create at least a grounding path therebetween.

5. An electronic device comprising:

a conductive housing defining opposite first and second ends thereof;

an electrical connector positioned at one of said first and second ends;

said housing integrally forming a pair of conductive grounding posts by two sides of said connector; wherein said pair of conductive grounding posts cooperate with the connector for stably together mating with a complementary connector; wherein a printed circuit board is mounted in said housing with grounding devices electrically connected to said housing to establish a grounding path.

\* \* \* \* \*